United States Patent
Price et al.

(10) Patent No.: US 10,424,064 B2
(45) Date of Patent: Sep. 24, 2019

(54) INSTANCE-LEVEL SEMANTIC SEGMENTATION SYSTEM

(71) Applicant: Adobe Inc., San Jose, CA (US)

(72) Inventors: Brian Price, San Jose, CA (US); Scott Cohen, Sunnyvale, CA (US); Jimei Yang, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/296,845

(22) Filed: Oct. 18, 2016

(65) Prior Publication Data

US 2018/0108137 A1    Apr. 19, 2018

(51) Int. Cl.
*G06K 9/34* (2006.01)
*G06T 7/11* (2017.01)

(52) U.S. Cl.
CPC ...... *G06T 7/11* (2017.01); *G06T 2207/10004* (2013.01); *G06T 2207/20081* (2013.01); *G06T 2210/12* (2013.01)

(58) Field of Classification Search
CPC . G06T 2207/10004; G06T 2207/20081; G06T 2210/12
See application file for complete search history.

(56) References Cited

U.S. PATENT DOCUMENTS

2015/0347822 A1* 12/2015 Zhou ................. G06K 9/4628
382/118
2016/0104058 A1* 4/2016 He ................. G06F 17/30247
382/156
2017/0169313 A1* 6/2017 Choi ................. G06K 9/6267
2018/0032840 A1* 2/2018 Yu .................... G06K 9/6256

OTHER PUBLICATIONS

Dai, Jifeng, et al. "Instance-Sensitive Fully Convolutional Networks", Computer Science—Computer Vision and Pattern Recognition, arXiv:1603.086678v1 Mar. 29, 2016, 15 pages.
Hariharan, Bharath, et al., "Simultaneous Detection and Segmentation", Computer Vision and Pattern Recognition, arXi:1407.1808v1, Jul. 7, 2014, 16 pages.
Arnab, Anurag, et al., "Bottom-Up Instance Segmentation Using Deep Higher-Order CRFs", BMVC at http://www.robots.ox.ac.uk/~tvg/publications/2016/instancesegmentation.pdf, Sep. 8, 2016, 16 pages.

(Continued)

*Primary Examiner* — Phuoc Tran
(74) *Attorney, Agent, or Firm* — Kilpatrick Townsend & Stockton LLP

(57) ABSTRACT

Certain aspects involve semantic segmentation of objects in a digital visual medium by determining a score for each pixel of the digital visual medium that is representative of a likelihood that each pixel corresponds to the objects associated with bounding boxes within the digital visual medium. An instance-level label that yields a label for each of the pixels of the digital visual medium corresponding to the objects is determined based, in part, on a collective probability map including the score for each pixel of the digital visual medium. In some aspects, the score for each pixel corresponding to each bounding box is determined by a prediction model trained by a neural network.

18 Claims, 10 Drawing Sheets
(3 of 10 Drawing Sheet(s) Filed in Color)

(56) References Cited

OTHER PUBLICATIONS

Hariharan, Bharath, et al, "Hypercolumns for object segmentation and fine-grained localization", Proceedings of the IEEE Conference on Computer Vision and Pattern Recognition, Nov. 21, 2014 10 pages.
Chen, Yi-Ting, et al., "Multi-Instance Object Segmentation With Occlusion Handling", Proceedings of the IEEE Conference on Computer Vision and Pattern Recognition, Oct. 15, 2015, 9 pages.
Dai, Jifeng, et al., "Instance-Aware Semantic Segmentation Via Multi-Task Network Cascades", arXiv preprint arXiv:1512.04412, Dec. 14, 2015, 10 pages.
Li, K.E, et al., "Iterative Instance Segmentation" arXiv preprint arXiv:1511.08498, Nov. 26, 2015, 13 pages.
Liang, Xiadan, et al., "Reversible Recursive Instance-Level Object Segmentation", arXiv preprint arXiv:1511.04517, Nov. 14, 2015, 9 pages.
Tighe, Joseph, et al., Finding Things: Image parsing with regions and Per-Exemplar Detectors, In: Proceedings of the IEEE Conference on Computer Vision and Pattern Recognition, Jun. 2013, 9 pages.
Yang, Jimei, et al. "Context Driven Scene Parsing With Attention to Rare Classes" Proceedings of the IEEE Conference on Computer Vision and Pattern Recognition, Jun. 2014, 8 pages.
Long, Jonathan, et al., Fully Convolutional Networks for Semantic Segmentation, Proceedings of the IEEE Conference on Computer Vision and Pattern Recognition, Mar. 2015, 10 pages.
Noh, Hyeonwoo, et al., "Learning Deconvolution Network for Semantic Segmentation", Proceedings of the IEEE International Conference on Computer Vision., May 2015, 9 pages.
Tighe, Joseph, et al., "Scene Parsing With Object Instances and Occlusion Ordering", Proceedings of the IEEE Conference on Computer Vision and Pattern Recognition, Jun. 2014, 8 pages.
Xu, Ning, et al., "Deep Interactive Object Selection", Proceedings of the IEEE Conference on Computer Vision and Pattern Recognition (see arXiv preprint arXiv:1603.04042), 2016, 9 pages.
Krahenbuhl, Phillipp, et al., "Efficient Inference in Fully Connected CRFs With Gaussian Edge Potentials", edge potentials. arXiv preprint arXiv:1210.5644, Oct. 2012, 9 pages.
Ren, Shaoqing, et al., Faster R-Cnn: Towards Real-Time Object Detection With Region Proposal Networks, Advances in Neural Information Processing Systems, 2015 9 pages.
Silberman, Nathan, et al., "Instance Segmentation of Indoor Scenes Using a Coverage Loss", Proceedings of the European Conference on Computer Vision, 2014, 16 pages.
Zhang, Ziyu, et al., "Monocular Object Instance Segmentation and Depth Ordering With CNNs", Proceedings of the International Conference on Computer Vision., 2015, 9 pages.
Lin, Tsung-Yi, et al., "Microsoft coco: Common objects in context", Proceedings of the European Conference on Computer Vision, 2014, arXiv:1405.0312v3, Feb. 21, 2015, 15 pages.
Rother, Carsten, "Grabcut: Interactive Foreground Extraction Using Iterated Graph Cuts", ACM Transactions on Graphics (TOG). vol. 23., ACM, 2004, 6 pages.
Tang, Meng, et al., "Grabcut in One Cut", Proceedings of the IEEE International Conference on Computer Vision, 2013, 8 pages.
Lempitsky, Victory, et al., "Image Segmentation With a Bounding Box Prior, Proceedings of the International Conference on Computer Vision, IEEE, Oct. 2009, 11 pages.
Yang, Jimei, et al., "Object Contour Detection With a Fully Convolutional Encoder-Decoder Network", Proceedings of the IEEE Conference on Computer Vision and Pattern Recognition, 2016, 10 pages.
Simonyan, Karen, et al., "Very Deep Convolutional Networks for Large-Scale Image Recognition",. arXiv preprint arXiv:1409.1556, Apr. 2016, 14 pages.
Kuhn, H., The Hungarian Method for the Assignment Problem, Naval Research Logistics Quarterly, 1955, 15 pages.
Hariharan, Bharrath, et al., "Semantic Contours From Inverse Detectors", Proceedings of the International Conference on Computer Vision, IEEE, 2011, 8 pages.
Kingma, Diederik, et al., "Adam: a Method for Stochastic Optimization", arXiv preprint arXiv:1412.6980, 2014, 15 pages.
Girshick, Ross, "Fast R-CNN", Proceedings of the IEEE International Conference on Computer Vision, 2015. ARxIV:1504.0803V2, 9 pages.
Arbel Pablo, et al., "Multiscale Combinatorial Grouping", Proceedings of the IEEE Conference on Computer Vision and Pattern Recognition, 2014, 8 pages.
Examination Report from related GB Application dated Dec. 19, 2017, 6 pages.

* cited by examiner

_US 10,424,064 B2_

INSTANCE-LEVEL SEMANTIC SEGMENTATION SYSTEM

TECHNICAL FIELD

This disclosure relates generally to computer-implemented methods and systems for digital image processing and more particularly relates to semantic segmentation of digital media at an instance level.

BACKGROUND

With advancements in digital cameras, smartphones, and other technology, the ability to capture, access, and utilize images and video has steadily increased. For instance, businesses now routinely utilize digital visual media for presentations, advertising, recruiting, merchandising, and other purposes, particularly for online platforms. Similarly, individuals now routinely utilize digital visual media for communication, entertainment, or employment purposes.

The increased proliferation in the use of digital visual media has resulted in an increase in the use of systems and methods for processing such digital visual media (e.g., modification or manipulation of a digital image or video). For instance, a digital image may include features or objects (e.g., a person, pet, car, etc.) that a user seeks to select and move, modify, copy, paste, or resize. In response to this user demand, some digital object selection systems have been developed that permit a user to identify, select, and label objects within a digital visual medium (e.g., a digital image). In some such systems, the identification of an object in a digital visual medium may involve a process that is at least partially automated.

In one example, a conventional system employs methods for detection (i.e., identifying an object in medium) and segmentation (e.g., partitioning the medium into segments corresponding to the object) that include generating a number of bounding boxes for an instance of an object. The bounding boxes include rectangles (or squares) defining a set of pixels that correspond to the location of a least a portion of the object. The segmentation is computed given the bounding boxes. This approach allows for multiple segmentations for a given object instance. The approach also often returns multiple overlapping candidates for a single object instance, with different class labels applied to each of the instances determined by the segmentation. The different class labels can result in a mislabeling of the object. Thus, this approach falls short of producing an actual instance-based segmentation of an image.

In another example, a conventional system employs a semantic segmentation method that labels all pixels of a given object class. For example, given a digital image including three people, the system labels all of the pixels corresponding to the three people as the class "person," without distinguishing one person object from another. Similarly, if one person in the image is touching another person (e.g., the two person objects are overlapping), conventional systems do not provide a way to separate them from each other, yielding a representation (e.g., an image mask) corresponding to both people rather than each person as individual target objects.

Thus, existing segmentation solutions algorithms may present disadvantages such as (but not limited to) those described above.

SUMMARY

One exemplary aspect of the present disclosure involves semantic segmentation of target objects in a digital visual medium at an instance level. For example, a processing device receives a set of bounding boxes corresponding to a set of target objects in a digital visual medium. For each of the bounding boxes, the processing device determines a score for each pixel of the digital visual medium. The score is representative of a likelihood that each pixel corresponds to the target objects corresponding to the bounding boxes. The processing device an instance-level label that yields a label for each of the pixels of the digital visual medium corresponding to the target objects based, in part, on a collective probability map including the score for each pixel of the digital visual medium.

Another exemplary aspect of the present disclosure involves automatically segmenting a digital visual medium. For example, a processing device receives a digital visual medium having a first bounding box corresponding to an object within a digital visual medium. The processing device, based on the first bounding box, generates a set of additional bounding boxes corresponding to the object within the digital visual medium. The first bounding box and the additional bounding boxes, in combination, form a bounding box set. The processing also generates a set of distance maps corresponding to the bounding box set. The processing device concatenates the digital visual medium with each distance map in the set of distance maps to generate a set of training pairs. A neural network is trained to segment pixels of the digital visual medium corresponding to the object based on the training pairs.

These illustrative features are mentioned not to limit or define the disclosure, but to provide examples to aid understanding thereof. Additional aspects are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings. The patent or application file contains at least one drawing executed in color. Copies of this patent or patent application publication with color drawing(s) will be provided by the Office upon request and payment of the necessary fee.

DETAILED DESCRIPTION

Figure 1:
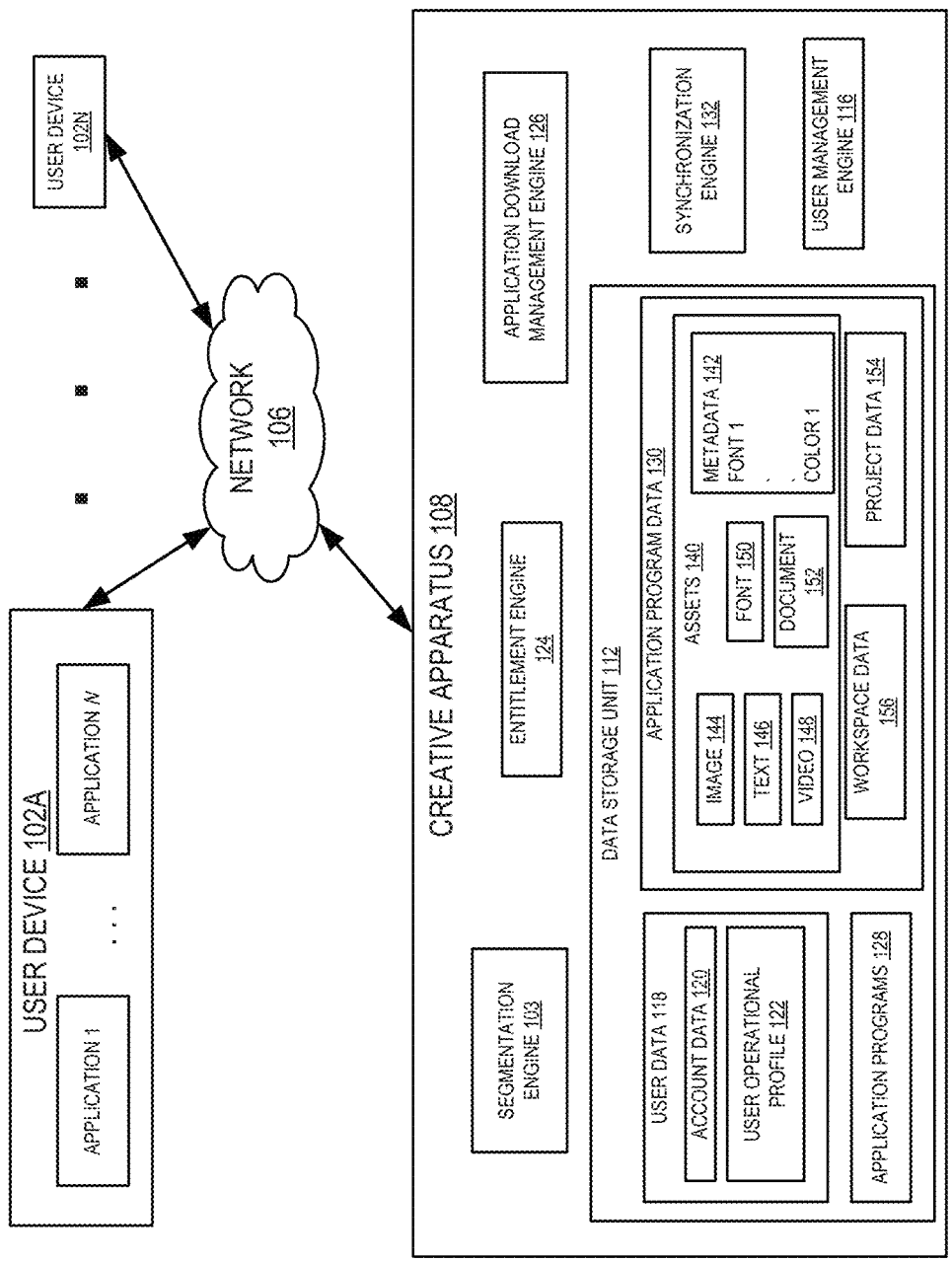
FIG. 1 is a block diagram depicting an example of a network environment for semantic segmentation of digital visual media according to an aspect of the present disclosure.

Certain aspects involve systems, methods, and computer-readable media employing techniques for segmenting a digital visual medium from a bounding box in the digital visual medium and appropriately labeling each instance of a target object at a pixel level. As explained above, conventional solutions for image segmentation may produce multiple segments for a given object instance. Certain aspects described herein produce a single segment corresponding to an object instance by training a neural network to detect and segment the object using a bounding box associated with the object. The bounding box may include a polygonal box surrounding the object, overlapping with the object, or otherwise associated to the object in the digital visual medium to define a set of pixels that may be associated with a location of the object in the medium. In one aspect, segmentation is employed by system using a neural network that is trained through a randomized set of bounding boxes for a target object. The neural network includes a convolutional encoder-decoder network and applies the bounding boxes to the neural network to construct a binary mask corresponding to the target object. Once the neural network is trained, a digital visual medium (e.g., an image) including bounding boxes corresponding to target objects is input to the neural network. The system determines a score corresponding to the likelihood that each pixel of each of the bounding boxes corresponds to the respective target object. The scores create a probability map for each of the bounding boxes. Weights are applied to the probability map for each bounding box based on a class score (e.g., a value corresponding to a likelihood that a pixel belongs to a certain class) associated with each bounding box. A collective probability map is determined from the probability maps for each of the bounding boxes to produce an instance-level labeling of the target objects in the digital visual medium. In some aspects, the pixels are labeled as part of an optimization, such as a dense conditional random field.

In one example, a convolutional neural network is trained to receive a bounding box corresponding to the target object and determine an accurate segmentation for the target object. The bounding box is received based on user input or from prior image-processing methods (e.g., a detection algorithm). The neural network is trained with bounding boxes of varying accuracies for the target object. For example, a creative apparatus or other suitable system, which implements the neural network, generates additional bounding boxes for the target object. The additional bounding boxes are generated with random dimensions based on the given bounding box. The system then generates distance maps corresponding to each of the bounding boxes and concatenates the digital visual medium with each of the distance maps to create training pairs for input to the neural network. The system trains the network using the training pairs to create binary masks of the target object.

Accordingly, the segmentation model of the neural network that is trained to have a high tolerance for the placement and dimensions of the bounding boxes. In particular, a desirable segmentation of a target object is able to be determined with limited regard to the positional relationship between the target object and the respective bounding box. For example, the target object may be wholly within a bounding box, partially within a bounding box, or outside of the bounding box. The segmentation model's ability to segment the target object in each of these scenarios is due to the training strategy employed on the neural network. The trained neural network subsequently receives bounding boxes and yields a single segmentation of the digital visual medium. In some aspects, this provides an improvement over conventional systems, which employ detection-based instance segmentation methods that produce multiple overlapping and redundant segmentations.

The instance-level segmentation methods according to aspects of the present disclosure, unlike conventional instance segmentation methods (e.g., systems using retrieval-based method), allows labeling of the pixels of a target object according to both the class associated with the target object and the instance. Specifically, reducing the number of bounding boxes and applying weights to the bounding boxes based on a class score allows the system to predict a class associated with a target object and, further, to distinguish between multiple target objects in a visual medium having the same class.

Turning now to the drawings, FIG. 1 is a diagram of a network environment 100 in which one or more aspects of the present disclosure can be practiced. The environment 100 includes user devices, such as user devices 102A-102N. Each of the user devices is connected to either a creative apparatus 108 or a marketing apparatus, or both, via a network 106. A user of the user devices uses various products, applications, or services supported by the creative apparatus 108 via the network 106.

The user device corresponds to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer (PC), tablet computer, a desktop computer, a processing unit, any combination of these devices, or any other suitable device having one or more processors. Each user device includes at least one application supported by the creative apparatus 108. It is to be appreciated that following description is now explained using the user device 102A as an example and any other user device can be used. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and by creating login details. Alternatively, the creative apparatus 108 can automatically create login details for the user in response to receipt of the user details. In some aspects, the user is also prompted to install an application manager. The application manager enables the user to manage installation of various applications supported by the creative apparatus 108 and to manage other functionalities, such as updates, subscription account and the like, associated with the applications. The user details are received by a user management engine 116 and stored as user data 118 in the data storage unit 112. In some aspects, the user data 118 further includes account data 120 under which the user details are stored.

The user either can opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some aspect, the user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one aspect, all application programs 128 are fetched and provided to the user via an interface of the application manager. In another aspect, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages a process of providing updates to the user device 102A.

Upon download, installation and launching of an application program, in one aspect, the user is asked to provide the login details. A check is again made by the user management engine 116 and the entitlement engine 124 to ensure that the user is entitled to use the application program. In another aspect, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The application program data 130 can be specific to the user or can be shared with other users based on rights management.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one aspect, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 154 and workspace data 156. In one aspect, the project data 154 includes the assets 140. In another aspect, the assets 140 are standalone assets. Similarly, the workspace data 156 can be part of the project data 154 in one aspect while it may be standalone data in other aspect.

A segmentation engine 103 is used to manipulate one or more of the assets 140. For example, the segmentation engine 103 employs a neural network or other suitable means to segment a digital visual medium (e.g., image 144, video 148) and label target objects within the digital visual medium at an instance, or pixel, level. Specifically, the segmentation 103 according to some aspects determines accurate segmentations given a bounding box from a detection algorithm, converts multiple, and potentially overlapping detection-based segmentations, into a instance-level labeling of the medium, and evaluates the accuracy of the result using an evaluation metric configured to handle the output of both detection-based and semantic segmentation-based methods. For example, the evaluation metric constructs a one-to-one mapping of the result and ground truth instances without requiring arbitrary intersection-over-union thresholds or detection scores. As used herein, "segment" or "segmentation" refers to a process of partitioning digital visual media into multiple regions, or sets of pixels). In some aspects, the goal of segmentation is to simplify or change the representation of an image into something that is more meaningful and easier to analyze (e.g., location of objects or boundaries in an image or video). In some aspects, the result of segmentation is a set of pixels (e.g., a mask) that identifies an object or boundaries in the visual medium. In further aspects, the segmentation engine 103 also employs the neural network or other suitable means to categorize or label identified objects based on a category or class associated with the object (e.g., "car," "person," "bus," etc.). For example, the segmentation engine 103 identifies and labels each instance, or pixel of an identified object based on a class assigned to the object. In another example, the segmentation engine 103 employs the neural network or other suitable means to distinguish between objects within the same visual medium and having the same class associated with the objects (e.g., "car 1" vs. "car 2," "person 1" vs. "person 2").

The user can have one or more user devices. The application program data 130 is accessible by the user from any device, i.e. including the device that was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user is logged in then a newly created asset or updates to the application program data 130 are provided in real time. The workspace data 156 enables the synchronization engine 132 to provide same workspace configuration to the user on any other device or to the other user based on rights management data.

In various aspects, various types of synchronization can be achieved. For example, the user can pick a font or a color from the user device 102A using a first application program and can use the font or the color in a second application program on any other device. If the user shares the font or the color with other users, then the other users can also use the font or the color. In some aspects, this synchronization occurs in real time. Similarly, synchronization of any type of the application program data 130 can be performed.

Segmentation

Figure 2:
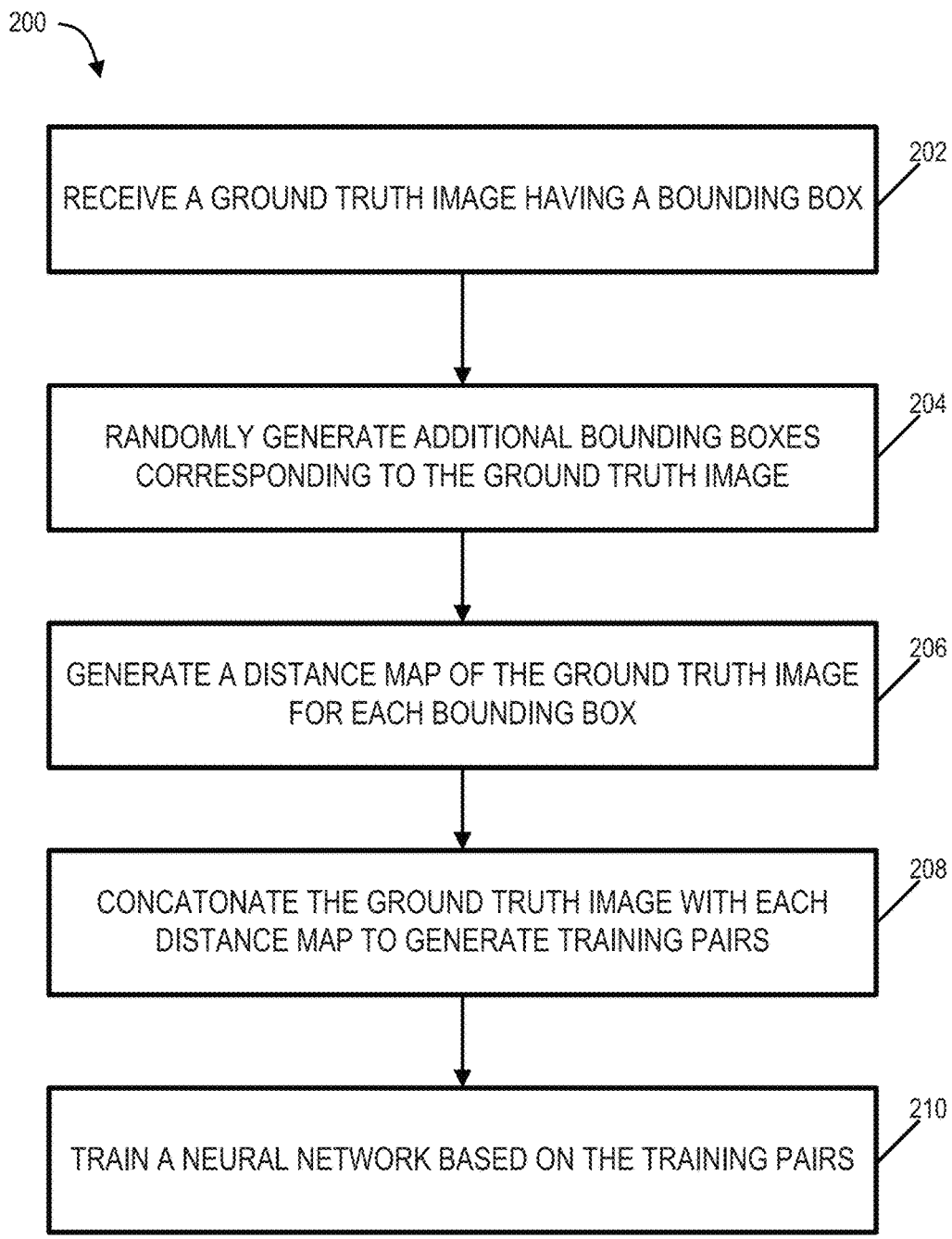
FIG. 2 is a flow chart depicting an example of a process for training a neural network to segment a digital visual medium according to an aspect of the present disclosure.

FIG. 2 is a flow chart 200 of an example process for training a neural network to segment a digital visual medium according to an aspect of the present disclosure.

In block 202, a ground-truth image is received that includes a bounding box corresponding to a target object within the ground-truth image. In some aspects, the ground-truth image is received by a neural network. For example, the segmentation engine 103 of the creative apparatus 108 employs a neural network to receive a visual medium input and to generate a mask representing pixels of a target object within the visual medium. The bounding box may be manually added to the ground-truth image by the user or other entity, automatically added to the ground-truth image by the creative apparatus 108 or other system, or added by other suitable means.

In block 204, additional bounding boxes are randomly generated for the ground-truth image. In some aspects, the additional bounding boxes are generated using a jittering operation or other suitable means for generating multiple bounding boxes from an original bounding box. In one example, the jittering operation includes adding a random noise to the pixels on the ground-truth image representing the bounding box in order to create additional, random bounding boxes of varying sizes and shapes. The additional bounding boxes, like the bounding box received with the ground-truth image, correspond to the target object within the ground-truth image. For example, the ground-truth image may include a picture of a dog. Each of the bounding boxes may correspond to the picture of the dog.

In block 206, a distance map of the ground-truth image is generated for each of the bounding boxes. In some aspects, the distance map is generated by determining the distance from each pixel of the ground-truth image to a respective bounding box. The determination is insensitive to the placement of the respective bounding box. For example, given one of the bounding boxes within the ground-truth image, the pixels of the image along the bounding box are defined as a set $S_e$, the pixels inside the bounding box are defined as a set $s_i$, and the pixels outside of the bounding box are defined as a set $s_o$. A distance map, D, is created having the same width and height as the ground-truth image. The distance map at the location of each pixel of the image is determined using the following relationships:

$$D(p_i) = \begin{cases} 128 - \min_{\forall p_j \in S_e} |p_i - p_j|, & \text{if } p_i \in S_i, \\ 128, & \text{if } p_i \in S_e, \\ 128 + \min_{\forall p_j \in S_e} |p_i - p_j|, & \text{if } p_i \in S_o, \end{cases}$$

where $|p_i - p_j|$ denotes the Euclidean distance between a location of a pixel of the ground-truth image, $p_i$, and a location of a pixel of the bounding box, $p_j$. In some aspects, the values of D are truncated between zero and 255 for efficiency of data storage in the data storage unit 112 or other suitable storage device.

In block 208, the ground-truth image is concatenated, or otherwise combined, with the distance map for each bounding box to generate a set of training pairs. For example, where the ground-truth image contains five bounding boxes, yielding five distance maps corresponding to each of the five bounding boxes, the ground-truth image is concatenated with each of the five distance maps to create five training pairs. In some aspects, the concatenation operation is applied by the segmentation engine 103 of the creative apparatus 108 where the distance maps are concatenated with the channels of the ground-truth image.

In block 210, the training pairs are used to train the neural network 300. In some aspects, each of the training pairs is input into neural network.

Figure 3:
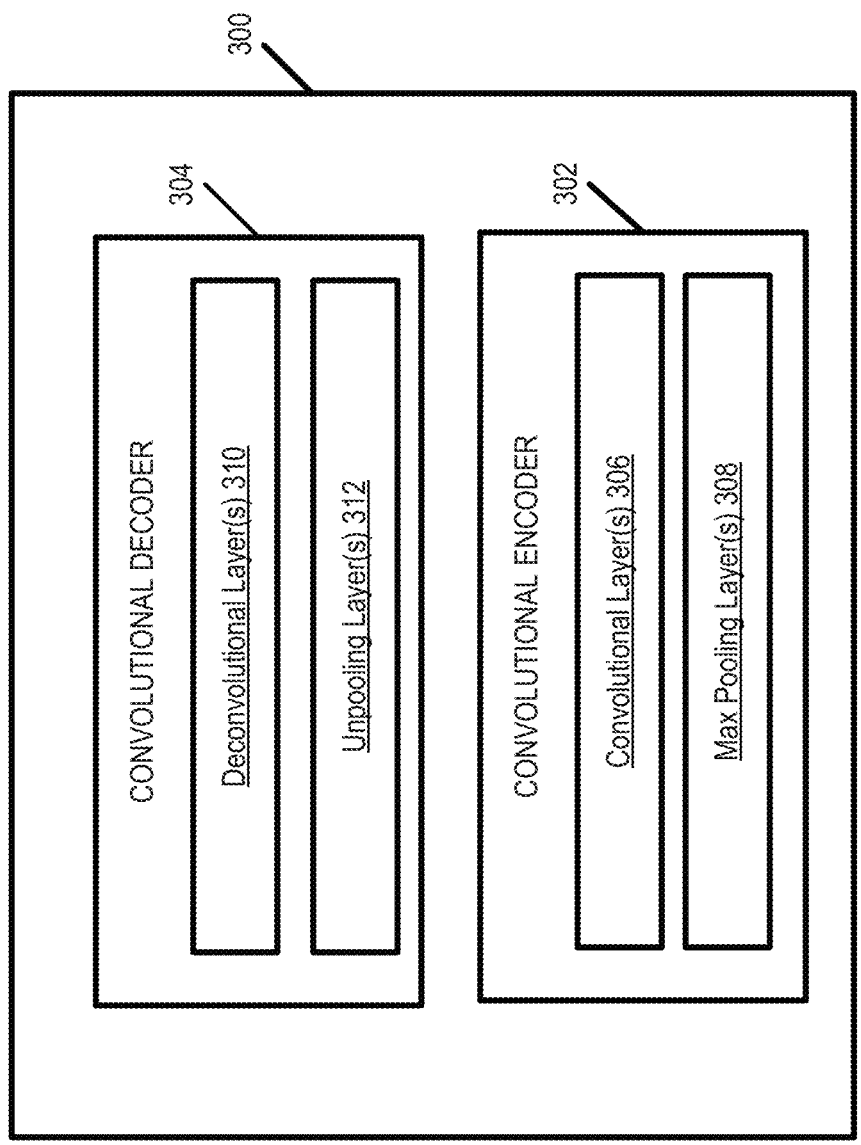
FIG. 3 is a block diagram depicting an example of a neural network for employing a segmentation model according to an aspect of the present disclosure.

FIG. 3 is a block diagram depicting an example of a neural network 300 that is trainable to employ a segmentation model according to an aspect of the present disclosure. The training pairs generated using the process described in FIG. 2 are input into the neural network to predict a binary instance mask corresponding to the target object within the ground-truth image. In some aspects, the binary instance mask is compared to the ground-truth image to determine the binary instance mask. The neural network 300 is adjusted to correct for any inaccuracy.

The neural network 300 is a convolutional encoder-decoder network ("CEDN") which includes a convolutional encoder 302 and a convolutional decoder 304. The convolutional encoder includes a network of neurons forming a sequence of convolutional layers 306 and max pooling layers 308. Each of the convolutional layers 306 in the convolutional encoder 302 includes a set of learnable filters, or kernels. The filters positioned in the first convolutional layer 306 are convolved across the dimensions (e.g., the width and the height) of the concatenated ground-truth image and distance map. The filters in subsequent layers are convolved over the output of the previous layer 306. In some examples, a dot product is computed between the entries of the filter and the training pair to produce a two-dimensional activation map of the filter that causes the filters to activate when they see a specific type of feature (e.g., a bounding box) at a spatial position in the training pair. The filters at the first convolutional layer 306 have four channels to update the parameters of the convolutional encoder 302 throughout the training. The max pooling layers 308 performs non-linear down-sampling. For example, the max pooling layers 308 partition the input into a set of non-overlapping rectangles and outputs the maximum for each sub-region of the non-overlapping rectangles. The max pooling layer reduces the spatial size of the input to reduce the amount of parameters and computation in the network. In some aspects, the convolutional encoder 302 is initialized with a classification network (e.g., VGG-16 parameters), with the extra channel of filters in the first convolutional layer 306 being initialized with zeroes.

The convolutional decoder 304 includes a network with deconvolutional layers 310 and unpooling layers 312 to reconstruct the details of the image. The reconstruction may be applied from course-to-fine. The convolutional decoder 304 is initialized with Gaussian random variables. At the beginning of each training epoch, the training pairs are resampled at the data of corresponding to the training pairs is shuffled, randomly.

Figure 4:
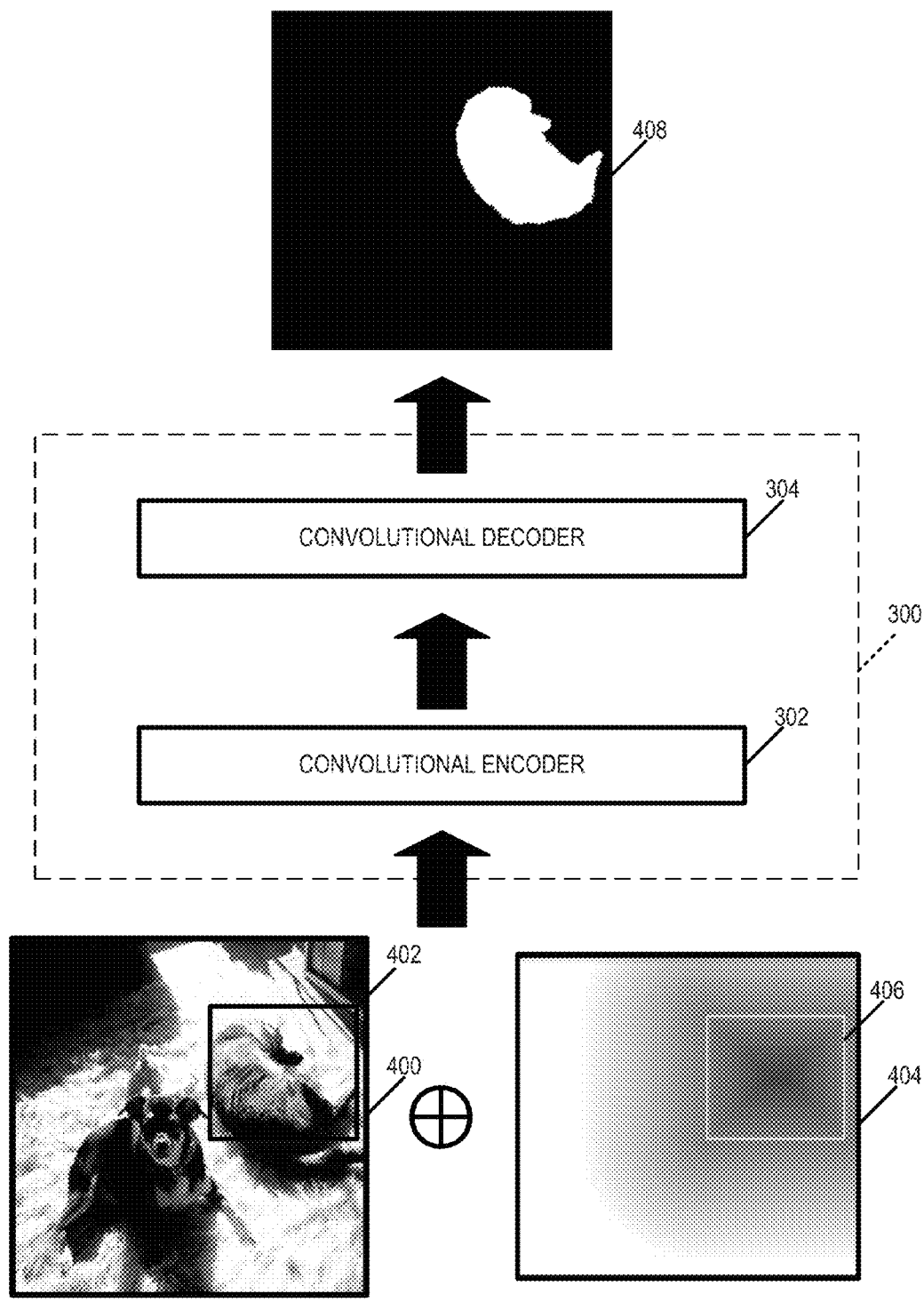
FIG. 4 is flow chart depicting an example of segmenting an image by a trained neural network according to an aspect of the present disclosure.

FIG. 4 shows a flow diagram of segmenting an image by a trained neural network 300 according to an aspect of the present disclosure. A ground-truth image 400 includes an image of two dogs. The target object of the ground-truth image 400 includes one of the dogs positioned mostly within a bounding box 402 received with the ground-truth image 400. A distance map 404 is generated from the ground-truth image 402. In some aspects, the distance map 404 is generated using the process described in block 206 of FIG. 2. The distance map 404 includes a bounding box 406 corresponding to the bounding box 402 of the ground-truth image 400. The ground-truth image 400 and the distance map 404 are concatenated to form a training pair that is input into the neural network 300. The training pair is input to the convolutional encoder 302 and the convolutional decoder 304 networks to generate a binary mask 408. The binary mask 408 represents the pixels of the target object (e.g., the dog) in the ground-truth image 400 corresponding to the bounding box 402. In additional and alternative aspects, the output of the network may include may include a map corresponding to the probability of the foreground of the ground truth image 400 over a continuous interval (e.g., 0 to 1) as opposed to a binary mask (e.g., 0 and 1). In some aspects, the process may be repeated for each training pair corresponding to each bounding box generated for the target object of the ground-truth image 400.

Instance-Level Labeling

Figure 5:
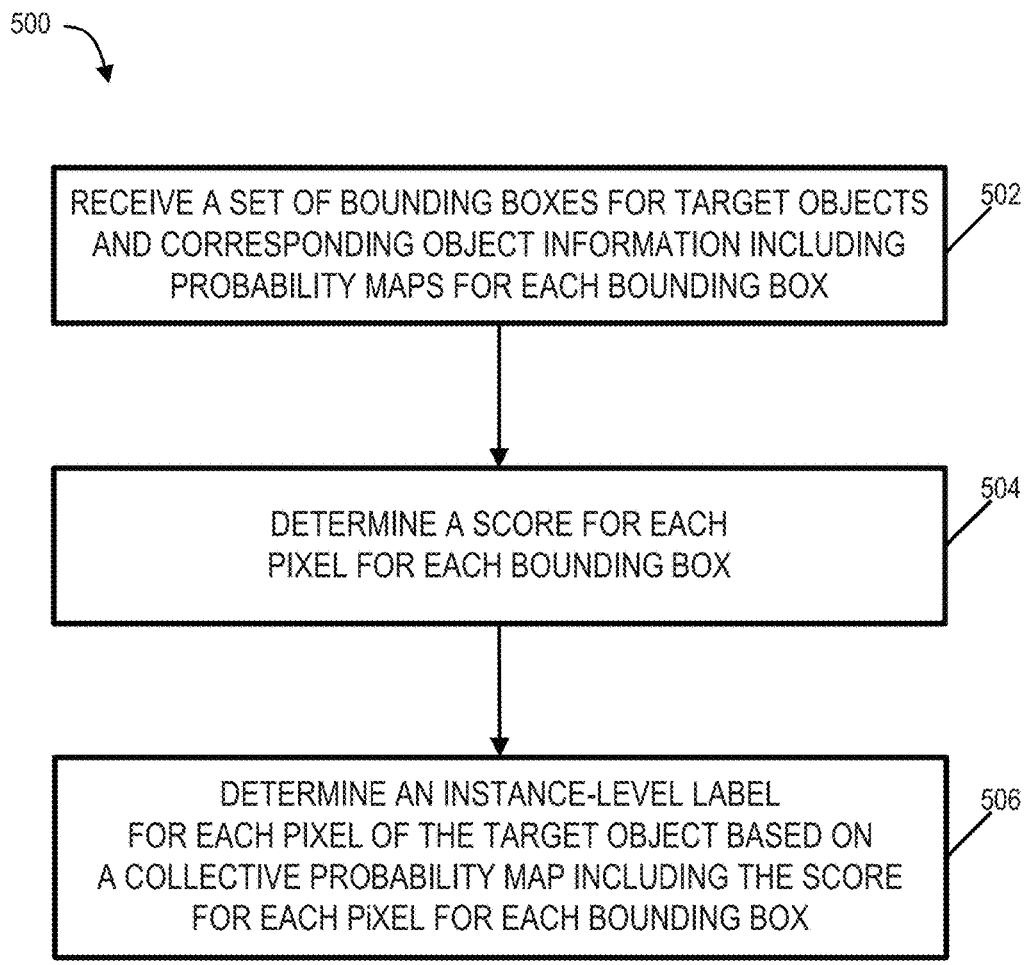
FIG. 5 is a flow chart depicting an example of a process for instance-level labeling of a target object in a digital visual medium according to an aspect of the present disclosure.

FIG. 5 is a flow chart 500 of an example process for instance-level labeling of a target object in a digital visual medium according to an aspect of the present disclosure. Although the process is described in connection with the segmentation process described in FIG. 2, the instance-labeling process may be applied to digital visual media segmented based on other known methods without departing from the scope of the present disclosure.

In block 502, a set of bounding boxes and corresponding object information for a set of target objects is received. In some aspects, the bounding boxes are included on a digital visual medium (e.g., an image) and correspond to one or more target objects in the image. In some aspects, the bounding boxes are determined from a detection algorithm or other means for detecting the target objects within the digital visual medium. In a further example, one or more of the bounding boxes overlap. The object information includes information corresponding to the digital visual medium or the target object within the digital visual medium. In some aspects, the object information includes class labels or class scores corresponding to the target objects corresponding to the bounding boxes. For example, each bounding box includes a class label identifying the class of the image associated with the bounding box. In another example, the class score represents a likelihood that a pixel in the bounding box corresponds to an object within the identified class. In other aspects, the class score is determined from an alternative process, such as implementing an object proposal algorithm to return a bounding box and a separate classification algorithm to determine a class and an accompanying class score corresponding to the bounding box.

In some aspects, the number of bounding boxes in the received set is reduced. For example, some of the bounding boxes are reduced using a non-maxima suppression ("NMS") operation. In some aspects, the segmentation engine 103 includes instructions for employing the operation. For example, the non-maxima suppression operation is generally applicable to determine overlapping bounding boxes, apply an overlap threshold to determine whether any of the bounding boxes overlap by a ratio or percentage that is at or above the overlap threshold, and discard such bounding boxes as redundant.

In block 504, a pixel score is determined for each pixel within each bounding box of the digital visual medium. The pixel score, or probability, for each pixel corresponds to a likelihood that the pixel corresponds to the target object associated with each bounding box. In some aspects, the pixel score is determined by the neural network based on the training discussed in the process of FIG. 4. The score for each pixel makes up a foreground probability map. For example, a foreground probability map includes, for each pixel within a bounding box, a percentage corresponding to the likelihood that the pixel corresponds to the target object. In some aspects, a background probability map for each bounding box is also determined using the pixel score. The background probability map includes, for each pixel within the bounding box, a percentage corresponding to the likelihood that the pixel corresponds to the background (e.g., any portion of the digital visual medium in the bounding box that is not the target object). In this regard, the percentages for each pixel in the foreground probability map and the background probability maps should be normalized, or scaled, such that the sum of the percentage values equals one (e.g., 100%). The percentage maps may be represented as a two-dimensional matrix with entries corresponding to the pixels in the digital visual medium, or within a bounding box of the digital visual medium.

In some aspects, weights are applied to the remaining set of bounding boxes. The weights may be applied using the class scores included in the object information received with the bounding boxes. The weights may be used to update the probability maps. For example, the following relationships may be used to apply a weight for each bounding box to determine weighted foreground and background probability maps:

$$P_i^{fw} = s_i \times P_i^f,$$

$$P_i^{bw} = 1 - P_i^f,$$

where $P_i^f$ is the foreground probability map, $P_i^b$ is the background probability map, $s_i$ is the class score for the target object corresponding to the bounding box, $P_i^{fw}$ is the weighted foreground probability map, and $P_i^{bw}$ is the weighted background probability map.

In block 506, a collective probability map is determined. The collective probability map corresponds to a product of the probability maps. For example, in some aspects a collective foreground probability map is determined based on a product of the foreground probability maps for each of the bounding boxes. In another example, a collective background probability map is determined based on a product of the background probability maps for each of the bounding boxes. For instance, the collective background probability map, $P^{bc}$ is determined using the weighted background probability map for each of the remaining bounding boxes based on the following relationship:

$$P^{bc} = \Pi_{i=1}^{N} P_i^{bw},$$

where N is the number of bounding boxes in the remaining set. In some aspects, the collective background probability map and the weighted foreground probability maps, for each bounding box, are normalized.

An instance-level label for each pixel of the target object is determined based on the collective probability map. In some aspects, the instance-level label may be determined using a fully connected Conditional Random Field ("CRF") model. In particular, the following object relationship may be employed:

$$E(l) = \sum_i \varphi_u(l_i) + \sum_{i<j} \varphi_p(l_i, l_j),$$

where l is the label assignment for all of the pixels, and the unary potentials are defined as $\varphi_u(l_i) = -\log(P(l_i))$, where $P(l_i)$ is the normalized probability at pixel i of the label $l_i$'s probability map. In some examples, pairwise potentials will have the form:

$$\varphi_p(l_i, l_j) = w \times \mu(l_i, l_j) \times \exp\left(-\frac{|p_i - p_j|^2}{2\theta_\alpha^2} - \frac{|I_i - I_j|^3}{2\theta_\beta^2}\right),$$

where w is a linear combination weight, $\mu(l_i, l_j)$ is the compatibility of the label to an adjacent label (e.g., a person standing next to another person may yield a high compatibility, the likelihood of a car beside a swimming pool may yield a low compatibility), and $\theta_\alpha, \theta_\beta$ are hyper-parameters that control the effective regions of the kernels. In some aspects, the pairwise potential penalizes a label disagreement between nearby pixels having similar, or the same, colors. The penalization reduces a false-alarm detection. The CRF model is optimized based on the efficient mean field approximation.

Each pixel is assigned an instance-level label $l_i$. The category label of the pixel corresponds to the detection label associated with the original bounding box in which the pixel resides.

Figure 6:
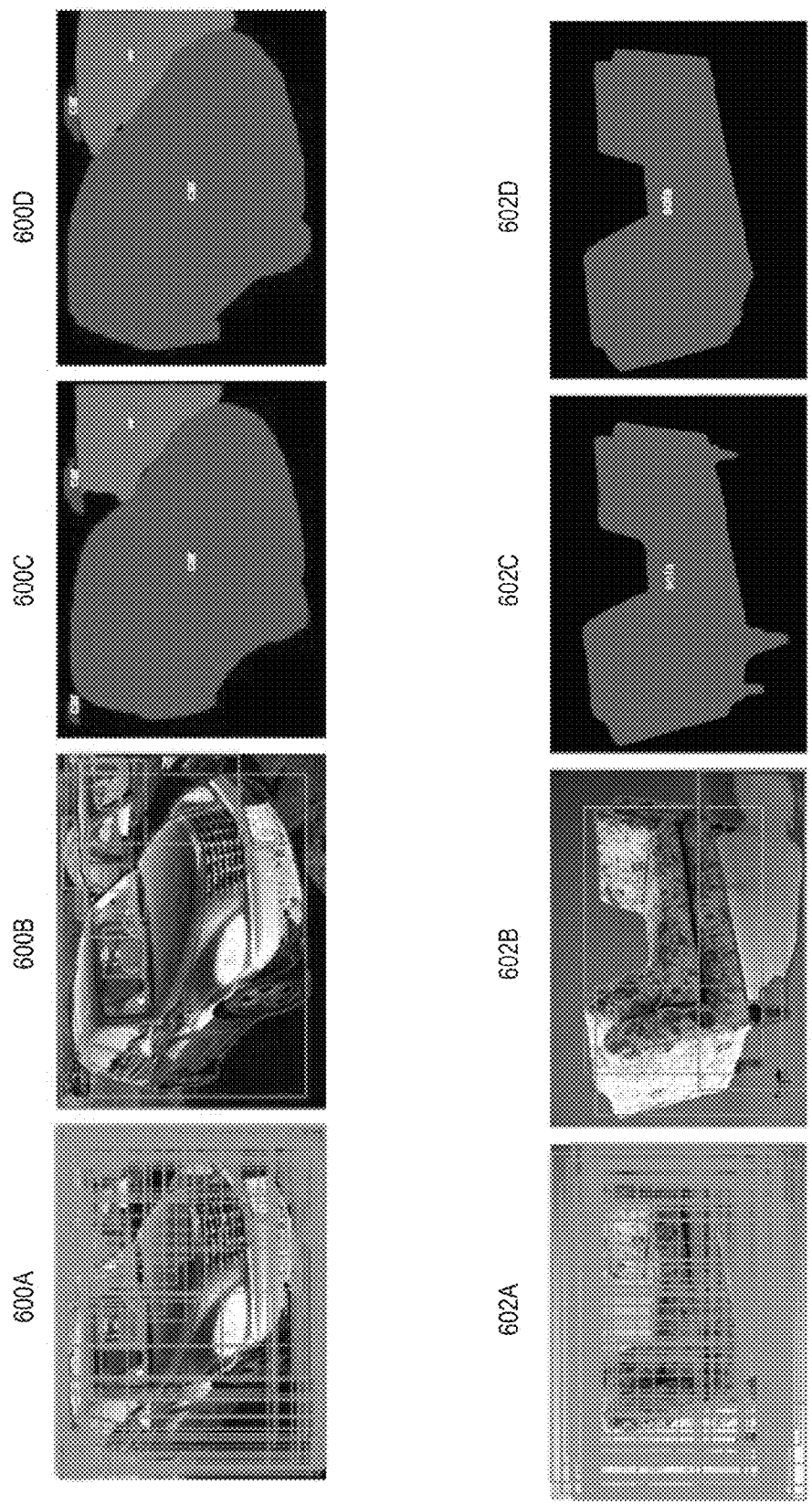
FIG. 6 illustrates examples of images segmented and labeled according to an aspect of the present disclosure.

FIG. 6 illustrates examples of images segmented and labeled according to an aspect of the present disclosure. Images 600A, 600B represent images for input into a trained neural network (e.g., neural network 300 of FIGS. 3 and 4). The image 600A is an image of multiple cars. Each car represents a target object in the image 600A and includes a set of bounding boxes corresponding to each car. Image 600B illustrates the cars with a reduced number of bounding boxes. In some examples, the number of bounding boxes is reduced using an NMS operation as described in block 504 of FIG. 5. Representation 600C is the output mask representing the pixels of the cars in the image 600A segmented and labeled at an instance level as described in block 510 of FIG. 5. Each car is distinguishable in the segmentation and the labeling despite being of the same category. Representation 600D is a mask of a ground-truth image of the cars used to verify the accuracy of the representation 600C.

Image 602A is an image of a sofa in a room. The sofa represents a target object in the image 602A. A set of bounding boxes corresponding to the sofa is included on the image 602A. Image 602B illustrates the sofa with a reduced number of bounding boxes. Representation 602C is the output mask representing the pixels of the sofa in the image 602A. Representation 602D is a mask of a ground-truth image of the sofa used to verify the accuracy of the representation 600C. As seen by the comparison of the representations 600C, 602C as compared with the representations 600D, 602D, the system is trained to identify accurately the target objects in the images 600A, 600B.

Accuracy of the Instance-Level Segmentation

Figure 7:
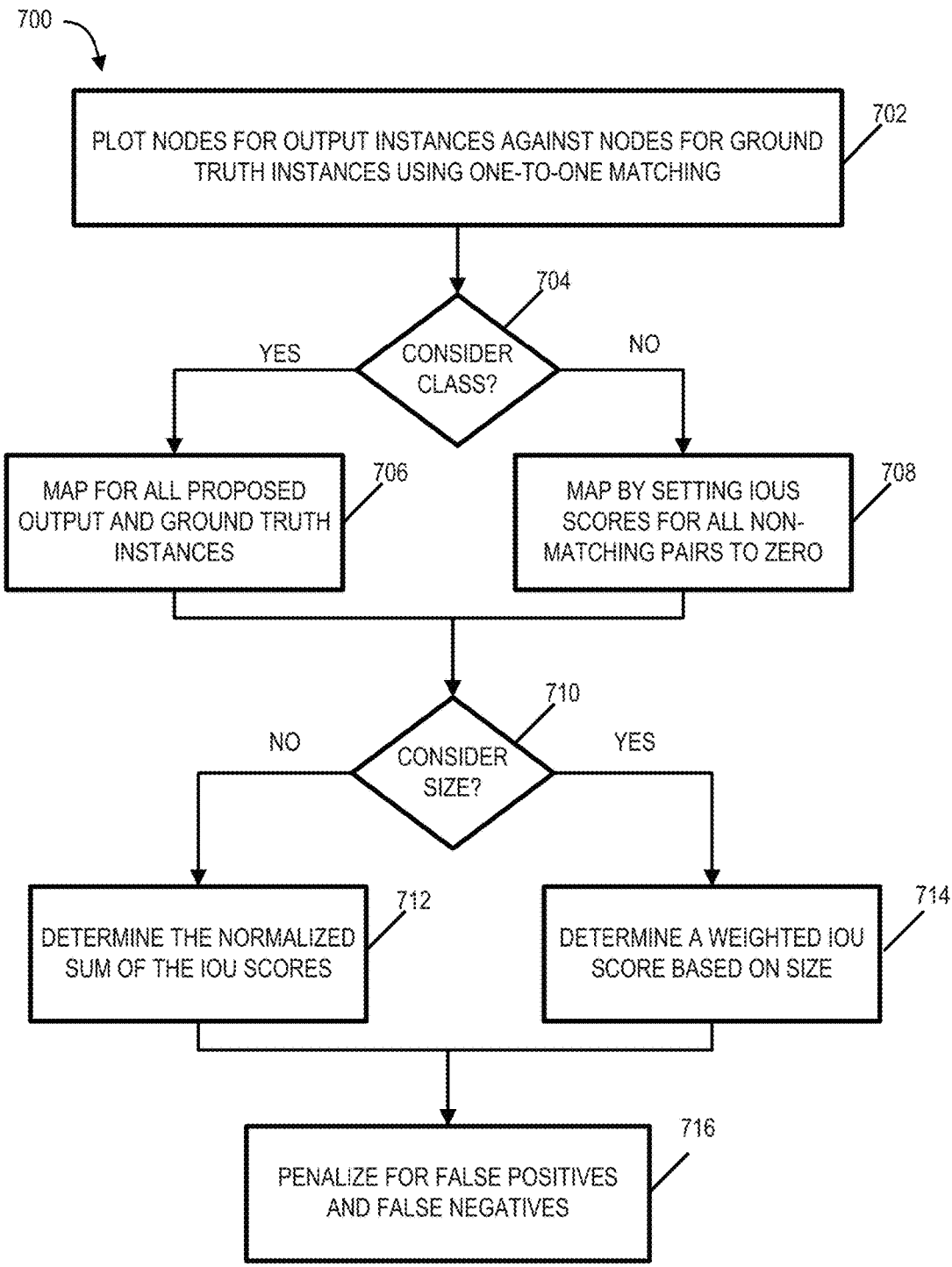
FIG. 7 is a flow chart depicting an example of a process for determining the accuracy instance-level segmentation according to an aspect of the present disclosure.

FIG. 7 is a flow chart of an example of a process for determining the accuracy instance-level segmentation according to an aspect of the present disclosure. In some aspects, the process may be applied to an output instance determined using one of the methods described herein and a ground-truth instance of a visual medium. But, the process may be applied to an output instance determined using any known method for instance-level segmentation without departing from the scope of the present disclosure.

In block 702, nodes of an output instance are plotted against a ground-truth instance using a one-to-one matching. The nodes for the output instances correspond to pixels of a target object included in an image, as segmented according to the present disclosure (e.g., representation 600C of FIG. 6). The nodes for the ground-truth instances correspond to pixels of a target object included in a ground-truth image (e.g., representation 600D of FIG. 6). A one-to-one mapping is applied to determine whether corresponding nodes between the target object in the output instances and the target object in the ground-truth instances are the same.

In some aspects, the similarity, or difference, between corresponding nodes is measuring using an intersection-over-union value. An intersection-over-union value is determined for each corresponding node pair.

Figure 8:
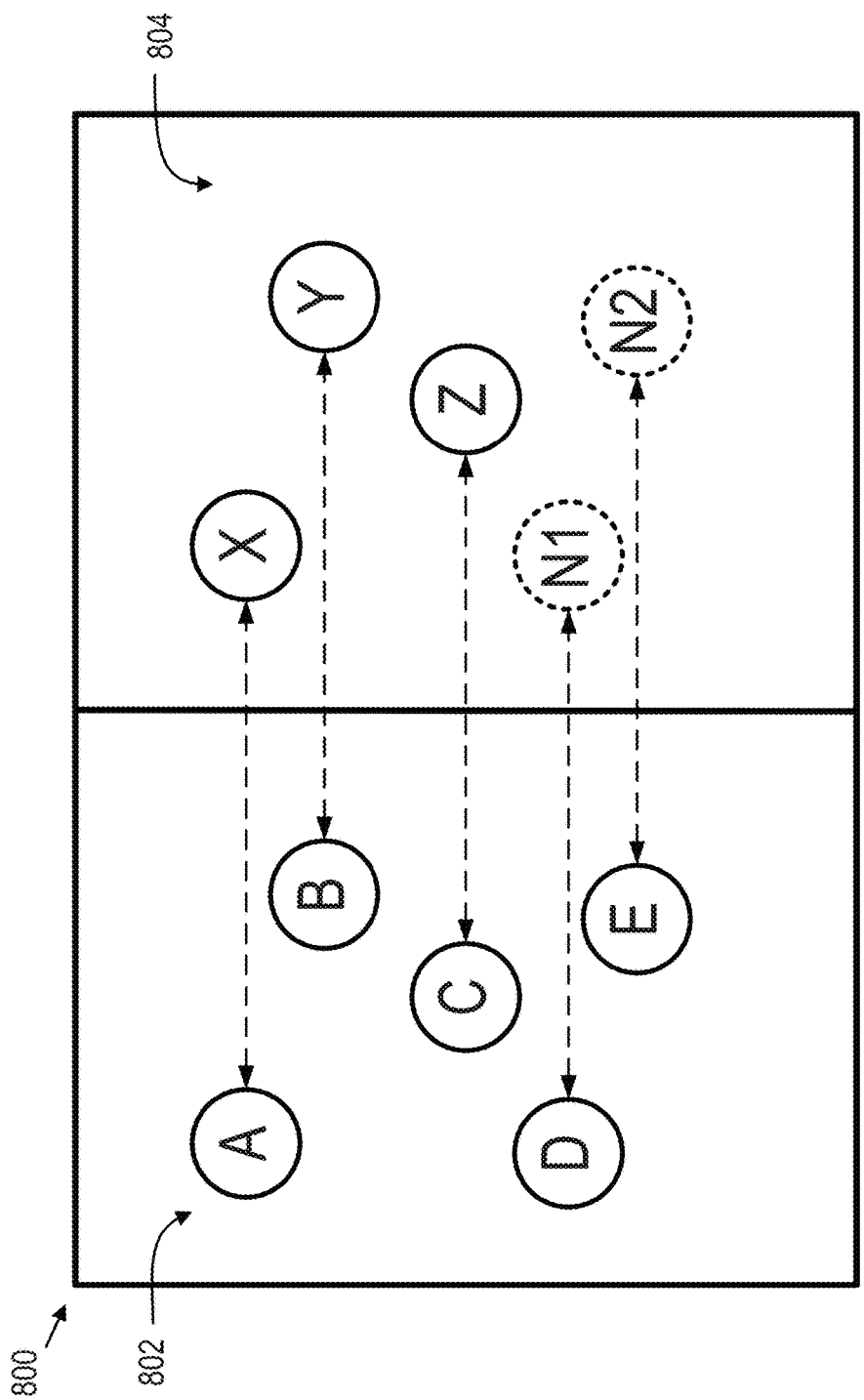
FIG. 8 is a plot graph of a visual illustration of output instances plotted against ground-truth instances according to an aspect of the present disclosure.

FIG. 8 is plot graph 800 providing a simplified visual illustration of output instances plotted against ground-truth instances according to an aspect of the present disclosure. The output instances correspond to the segments determined by the segmentation according to the methods disclosed here. The pixels are represented on side 802 of the plot graph 800 by nodes A-E. The ground-truth instances correspond to segments of the ground-truth instances. The pixels of the ground-truth instances are represented on side 804 of the plot graph 800 by nodes X-Z. For a one-to-one mapping, the number of nodes on each side of the plot graph 800 must be equal. Since the side 802 includes more nodes representing pixels of the output instances, an appropriate number of nodes are added to cause the number of nodes on the side 804 to equal the number of nodes on the side 802. For example, additional nodes N1-N2 are added to the side 804 for five nodes on each side of the plot graph 800. The nodes N1-N2 are null objects corresponding to zero pixels.

In some aspects, the plot graph 800 represents a bipartite graph G=(U,V,E), where U is a set of vertices in the graph representing the predicted segments (e.g., the output instances), V represents the ground-truth segments (e.g., the ground-truth instances), and E represents the set of edges between U and V (e.g., the possible mappings between U and V illustrated by the dotted arrows). For a bijection f: U→V, the bijection f* is determined to maximize the intersection-over-union across the mapped segments, or corresponding nodes using the relationship:

$$f^*(U, V) = \arg\max_f \sum_{u \in U} \frac{|u \cap f^*(u)|}{|u \cup f^*(u)|},$$

where u and f*(u) represent the nodes, or pixels in the output and ground-truth instances, respectively. In some aspects, the bijection f* is minimized based on the Hungarian algorithm or other suitable means for solving an assignment problem.

Returning to FIG. 7, a determination is made as to whether class consistency for the target objects should be enforced in the metric, or whether the metric is class agnostic and should not be considered as described in block 704. If the metric is determined to be class-independent (e.g., class is not considered), the process proceeds to mapping all of the output instances against the ground-truth instances (e.g., each of the nodes A-E on side 802 against each of the corresponding nodes X-Z and N1-N2 on side 804 of FIG. 8), as described in block 706. For each pair of corresponding instances, or nodes, an intersection-over-union value is attributed to the pair based on the measure of differences or similarities between the instances. If the metric is determined to require that the class is labeled correctly (e.g., class is considered), the process proceed to mapping the output instances against the ground-truth instances with the intersection-over-union being set to zero for corresponding nodes where the classes do not match, as described in block 708.

Proceeding to block 710, a determination is made as to whether the aggregate score of the matching is size-dependent (e.g., the sizes of the output and ground-truth representations of the target objects are considered) or size-independent (e.g., the sizes are not considered). In some aspects, a size-dependent score penalizes the output instance more for missing a larger object than a smaller object while the size-independent score penalizes missing large and small objects the same.

If the score is determined to be size-independent, the score is determined to be the normalized sum of the intersection-over-union scores for each mapping, as described in block 712. Returning to the plot graph 800 of FIG. 8 for illustration, the score includes the normalized sum of the intersection-over-union scores for corresponding node pairs A/X, B/Y, C/Z, D/N1, and E/N2. The following relationship represents the normalized sum of the intersection-over-union scores for each mapping:

$$S^i(U, V) = \frac{1}{|U|} \sum_{u \in U} \lambda_u \frac{|u \cap f^*(u)|}{|u \cup f^*(u)|}$$

Returning to FIG. 7, if the score is determined to be size-dependent, the score is the sum of the intersection-over-union scores, weighted by the size of the regions, as described in block 714. The following relationship represents the weighted sum of the intersection-over-union scores for each mapping:

$$S^p(U, V) = \sum_{u \in U} \lambda_u \frac{|u \cap f^*(u)|}{|u \cup f^*(u)|},$$

$$\lambda_u = \frac{|u \cup f^*(u)|}{\sum_{x \in U} x \cup f^*(x)}.$$

As the scores are weighted by the size, the relationship may also be simplified to the sum of the intersections divided by the sum of the unions:

$$S^p(U, V) = \frac{\sum_{u \in U} |u \cap f^*(u)|}{\sum_{u \in U} |u \cup f^*(u)|}$$

In block 716, the score is adjusted to penalize for false positives and false negatives, or precision and recall evaluations, respectively. In some aspects, a false positive corresponds to a mislabeled object (e.g., a target object having an incorrect category label). A false negative corresponds to a missed object (e.g., a target object was not given a label, or considered as background). A matching measurement is determined without using intersection-over-union thresholds (e.g., where only a number of mappings above the threshold are counted), and captures both the precision (e.g., false positives) and the recall (e.g., false negatives). The following relationship represents a standard way of determining the matching measurement:

$$\frac{2 \times P \times R}{P + R} = \frac{2 \times \frac{m}{|U|} \times \frac{m}{|V|}}{\frac{m}{|U|} + \frac{m}{|V|}} = \frac{2 \times m}{|U| + |V|},$$

where P and R are the precision and recall values, respectively, and m is the number of matches (e.g., the sum of the intersection-over-union values).

Figure 9:
FIG. 9 illustrates examples of representations comparing segmenting processes using a metric according to an aspect of the present disclosure.

FIG. 9 illustrates examples of representations comparing segmenting processes using the metric described in FIG. 7 according to an aspect of the present disclosure. The representations 900A, 902A correspond to results of a segmentation process according to a so-called Hypercolumn method described in Hariharan, B., Arbelaez, P., Girshick, R., Malik, J.: *Hypercolumns for object segmentation and fine-grained localization.* In: Proceedings of the IEEE Conference on Computer Vision and Pattern Recognition. (2015) 447-456. The contoured outlines of objects proximate to a target object (e.g., as defined by the bounding boxes) in the image represent the segmentation result using the Hypercolumn method.

The representations 900B, 902B correspond to results of a segmentation process according to aspects of the present disclosure. The contoured outlines of the target object represent the segmentation result using processes according to aspects of the present disclosure. Each of the representations 900A, 902B and the representations 900A, 902B is compared to the representations 900C, 902C to evaluate the accuracy of the process results. As indicated by the representations of FIG. 9, the segmentation results yielded according to aspects of the present disclosure, as illustrated by the representations 900B, 900C most closely match the segmentation of the ground-truth image.

Figure 10:
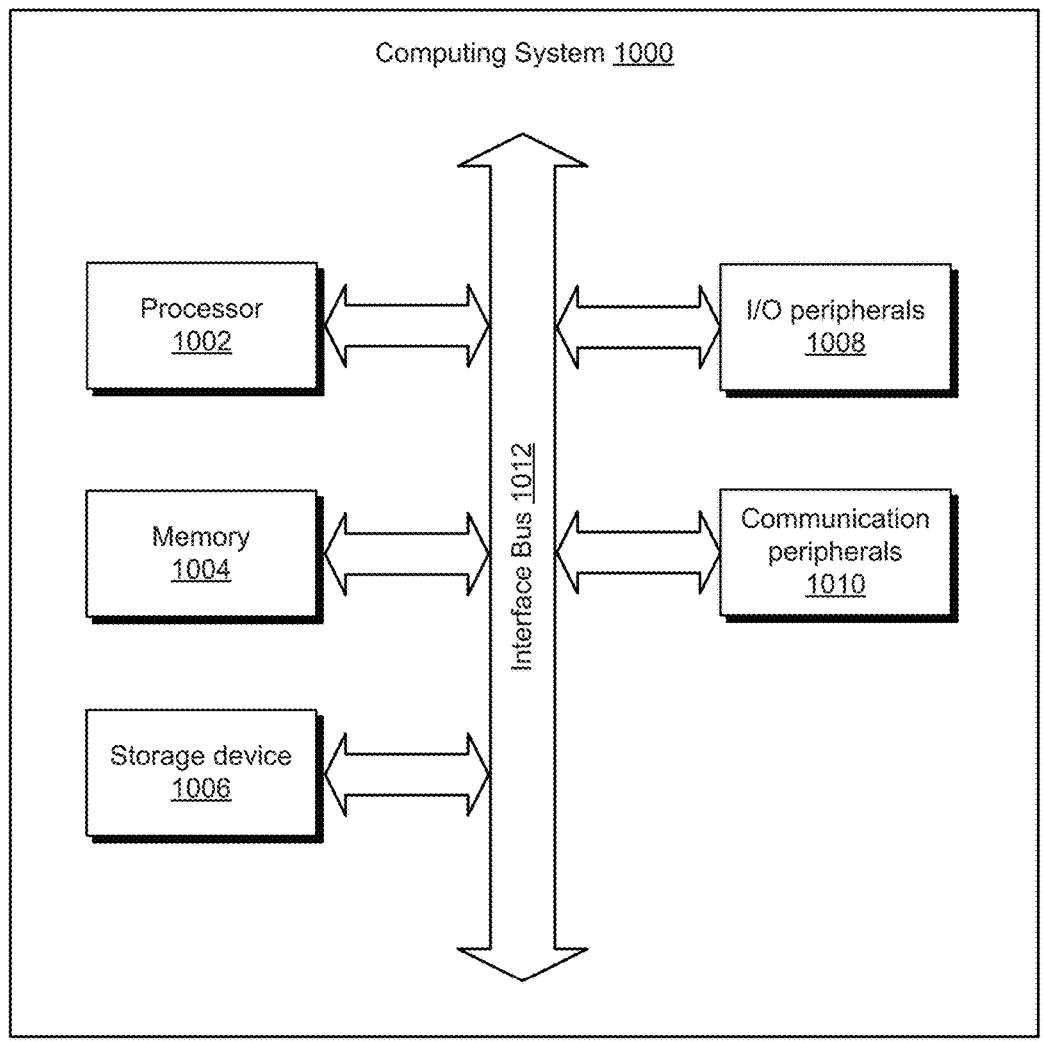
FIG. 10 is a block diagram of an example computing system for semantic segmentation of digital visual media according to an aspect of the present disclosure.

A suitable computing system may be programmed to perform the operations described herein. For example, FIG. 10 is a block diagram of an example computing system for semantic segmentation of digital visual media according to an aspect of the present disclosure. Each of the user devices 102A-102N, creative apparatus 108, a component thereof, or other suitable systems implement some or all of the illustrated components. Although these components are illustrated as belonging to a same computing system 1000, the computing system 1000 can be distributed.

The computing system 1000 includes at least a processor 1002, a memory 1004, a storage device 1006, input/output peripherals 1008, communication peripherals 1010, and an interface bus 1012. The interface bus 1012 is configured to communicate, transmit, and transfer data, controls, and commands among the various components of the computing system 1000. The memory 1004 and the storage device 1006 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computing system of, for example, a cloud network or a datacenter. The input and output peripherals 1008 include user interfaces such as a keyboard, screen, microphone, speaker, other input/output devices, and computing components such as graphical processing units, serial ports, parallel ports, universal serial bus, and other input/output peripherals. The input/output peripherals 1008 are connected to the processor 1002 through any of the ports coupled to the interface bus 1012. The communication peripherals 1010 are configured to facilitate communication between the computing system 1000 and other computing devices over a communications network and include, for example, a network interface controller, modem, wireless and wired interface cards, antenna, and other communication peripherals.

While the present subject matter has been described in detail with respect to specific aspects thereof, it will be appreciated that those skilled in the art, upon attaining an understanding of the foregoing may readily produce alterations to, variations of, and equivalents to such aspects. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an openended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for semantic segmentation of one or more objects in a digital visual medium, comprising:
    accessing, by a processing device, a set of bounding boxes potentially corresponding to a set of target objects within the digital visual medium;
    for each of the set of bounding boxes, determining, by the processing device, a pixel score for each pixel of the digital visual medium corresponding to the set of bounding boxes, the pixel score being representative of a likelihood that each pixel corresponds to the set of target objects associated with the set of bounding boxes;
    determining, by the processing device and for each pixel of the digital visual medium, an instance-level label that distinguishes a first set of pixels corresponding to a first object from a second set of pixels corresponding to a second object of a same class as the first object, each instance-level label determined based, at least in part, on a collective probability map including the pixel score for each pixel; and
    applying, by the processing device, at least some of the determined instance-level labels to at least some of the pixels of the digital visual medium.

2. The computer-implemented method of claim 1, wherein determining the pixel score comprises employing a prediction model trained by a neural network.

3. The computer-implemented method of claim 2, wherein the method further comprises training the neural network, said training comprising:
    receiving, by the processing device, a training visual medium having a first bounding box corresponding to a training target object within the training visual medium;
    generating, by the processing device and based on the first bounding box, a plurality of bounding boxes corresponding to the training target object within the training visual medium, the first bounding box and the plurality of bounding boxes together forming a training set of bounding boxes;
    generating, by the processing device, a plurality of distance maps, each distance map in the plurality of distance maps corresponding to a respective bounding box of the training set of bounding boxes;
    concatenating, by the processing device, the training visual medium with each distance map in the plurality of distance maps to generate a plurality of training pairs; and
    training, by the processing device and based on at least one training pair of the plurality of training pairs, the neural network to segment pixels of the training visual medium corresponding to the training target object.

4. The computer-implemented method of claim 3, wherein the neural network is a convolutional encoder-decoder network including:
    a convolutional encoder network having one or more convolutional layers for training filters to recognize one or more features of the one or more target objects, and one or more pooling layers for manipulating a spatial size of the at least one training pair; and
    a convolutional decoder network having one or more deconvolutional layers and one or more unpooling layers for reconstructing details of the digital visual medium,
    wherein training the neural network based on the at least one training pair includes inputting the at least one training pair to the convolutional encoder network and the convolutional decoder network to generate a binary instance mask corresponding to the training target object.

5. The computer-implemented method of claim 1, wherein the set of bounding boxes is received based on an object detection algorithm, wherein receiving the set of bounding boxes includes receiving class scores associated with the set of bounding boxes.

6. The computer-implemented method of claim 1, wherein the set of bounding boxes is received based on an object detection algorithm, wherein class scores corresponding to the set of bounding boxes are received based on a classification algorithm.

7. The computer-implemented method of claim 1, wherein the collective probability map is generated based on a plurality of probability maps for each bounding box of the set of bounding boxes, wherein each probability map of the plurality of probability maps is weighted based on class scores corresponding to each bounding box.

8. The computer-implemented method of claim 1, wherein determining the instance-level label includes using probabilities of the collection probability map to identify a compatibility between adjacent pixels corresponding to at least one of the set of target objects, the compatibility being identified using a conditional random field model.

9. A computing system for semantic segmentation of one or more objects in a digital visual medium, the computing system comprising:
  means for storing a plurality of digital media, the digital media including a digital visual medium having a bounding box set, the bounding box set including at a first bounding box potentially corresponding to a target object within the digital visual medium and a second bounding box potentially corresponding to a second target object within the digital visual medium; and
  means for determining, for each bounding box in the bounding box set, a pixel score for each pixel of the digital visual medium corresponding to each bounding box of the bounding box set, the pixel score being representative of a likelihood that each pixel corresponds to the target object associated with the at least one bounding box, said means being communicatively coupled to the means for storing the plurality of digital media;
  means for determining for each pixel of the digital visual medium, an instance-level label that distinguishes a first set of pixels corresponding to the first bounding box from a second set of pixels corresponding the second bounding box, each instance-level label determined based, at least in part, on a collective probability map including the pixel score for each pixel; and
  means for assigning at least some of the determined instance-level labels to at least some of the pixels in the digital visual medium.

10. The computing system of claim 9, wherein the means for determining the pixel score includes a neural network and a prediction model trained by the neural network.

11. The computing system of claim 10, further comprising a means for training the neural network by performing operations comprising:
  generating, based a training visual medium having a training target object and a first bounding box corresponding to the training target object, a plurality of bounding boxes corresponding to the training target object, the first bounding box and the plurality of bounding boxes together forming a training set of bounding boxes;
  generating a plurality of distance maps, each distance map in the plurality of distance maps corresponding to a respective bounding box of the training set of bounding boxes;
  concatenating the training visual medium with each distance map in the plurality of distance maps to generate a plurality of training pairs; and
  training, based on at least one training pair of the plurality of training pairs, the neural network to segment pixels of the training visual medium corresponding to the training target object.

12. The computing system of claim 11, wherein the neural network is a convolutional encoder-decoder network including:
  a convolutional encoder network having one or more convolutional layers for training filters to recognize one or more features of the target object and one or more pooling layers for manipulating a spatial size of the at least one training pair; and
  a convolutional decoder network having one or more deconvolutional layers and one or more unpooling layers for reconstructing details of the digital visual medium.

13. The computing system of claim 11, wherein the means for training the neural network includes means for performing the operation of training the neural network to segment the pixels by inputting the at least one training pair to a convolutional encoder and a convolutional decoder of the neural network to generate a binary instance mask corresponding to the training target object.

14. The computing system of claim 9, wherein the collective probability map is generated based on a plurality of probability maps for each bounding box of the bounding box set, wherein each probability map of the plurality of probability maps is weighted based on class scores corresponding to each bounding box.

15. The computing system of claim 9, wherein the means for determining the instance-level label includes means for using probabilities of the collection probability map to identify a compatibility between adjacent pixels corresponding to at least one of the target object, the compatibility being identified using a conditional random field model.

16. A non-transitory computer readable medium having program code executable by a processing device stored thereon, the program code comprising:
  program code for receiving a digital visual medium having a first bounding box corresponding to an object within the digital visual medium;
  program code for generating, based on the first bounding box, a plurality of bounding boxes corresponding to the object within the digital visual medium, the first bounding box and the plurality of bounding boxes together forming a bounding box set;
  program code for generating a plurality of distance maps, each distance map in the plurality of distance maps corresponding to a respective bounding box of the bounding box set;
  program code for concatenating the digital visual medium with each distance map in the plurality of distance maps to generate a plurality of training pairs; and
  program code for training, based on the training pairs, a neural network to segment pixels of the digital visual medium corresponding to the object.

17. The non-transitory computer readable medium of claim 16, wherein the program code further comprises program code for semantic segmentation of a set of target objects within an input visual medium received by a trained neural network by:
  receiving one or more bounding boxes potentially corresponding to the set of target objects;
  for each of the one or more bounding boxes, determining a score for each pixel for the input visual medium, the score being representative of a likelihood that each pixel corresponds to the set of target objects; and
  determining an instance-level label that yields a label for each of the pixels of the input visual medium corresponding to the set of target objects based, at least in part, on a collective probability map including the score for each pixel of the input visual medium.

18. The non-transitory computer readable medium of claim 16, wherein the program code for generating the plurality of distance maps comprises, for each distance map, program code for determining a distance from each pixel of the digital visual medium to the respective bounding box, wherein the plurality of distance maps have dimensions matching the digital visual medium.

* * * * *